United States Patent [19]

Ezrielev et al.

[11] Patent Number: 4,623,708

[45] Date of Patent: Nov. 18, 1986

[54] PREPOLYMERIZATION OF MONOMER COMPOSITIONS CONTAINING DIETHYLENE GLYCOL BIS(ALLYL CARBONATE)

[75] Inventors: Robert I. Ezrielev, Edison; Melvin E. Kamen, Woodcliff Right, both of N.J.; Donald H. Petcen, Colonial Heights, Va.

[73] Assignee: Coburn Optical Industries, Inc., Tulsa, Okla.

[21] Appl. No.: 707,049

[22] Filed: Mar. 1, 1985

[51] Int. Cl.⁴ ............................................. C08F 118/00
[52] U.S. Cl. ...................................... 526/314; 351/159
[58] Field of Search ............................................ 526/314

[56] References Cited

U.S. PATENT DOCUMENTS

| | | | |
|---|---|---|---|
| 3,872,042 | 3/1975 | Bond | 260/23 |
| 3,944,637 | 3/1976 | Bond et al. | 264/1 |
| 3,955,015 | 5/1976 | Ohtsuka et al. | 427/163 |
| 4,139,578 | 2/1979 | Baughman et al. | 260/871 |
| 4,146,696 | 3/1979 | Bond | 526/314 |
| 4,217,433 | 8/1980 | Dyball | 525/277 |
| 4,260,564 | 4/1981 | Baiocchi | 526/314 |
| 4,368,310 | 1/1983 | Leatherman | 526/314 |
| 4,373,075 | 2/1983 | Schwarz | 526/314 |
| 4,396,737 | 8/1983 | Leatherman | 526/314 |
| 4,398,008 | 8/1983 | Misura | 526/314 |
| 4,521,577 | 6/1985 | Romano | 526/314 |

OTHER PUBLICATIONS

Encyclopedia of Polymer Science and Technology, vol. 1, pp. 799–803, Interscience Publishers, New York, 1964.

*Primary Examiner*—Paul R. Michl
*Attorney, Agent, or Firm*—Curtis, Morris & Safford

[57] ABSTRACT

A prepolymerization step prior to casting reduces shrinkage during polymerization of a composition containing diethylene glycol bis(allyl carbonate) with up to 40% of a vinyl ester, preferably vinyl acetate, and one or more free radical type initiators. The prepolymerization step includes adding a small amount of free radical type initiator, which may be the same or different than that used just prior to casting, and heating to a temperature higher than one hour half-lifetime temperature of the initiator. In this manner, most of the added initiator is consumed and the prepolymerization produces the highest possible conversion while preventing over-polymerization. High yield of lenses of ophthalmic quality is obtained.

42 Claims, No Drawings

PREPOLYMERIZATION OF MONOMER COMPOSITIONS CONTAINING DIETHYLENE GLYCOL BIS(ALLYL CARBONATE)

FIELD OF THE INVENTION

This invention relates to polymers and copolymers of diethylene glycol bis(allyl carbonate) for casting as ophthalmic lenses and, in particular, a method of prepolymerizing a monomer composition containing diethylene glycol bis(allyl carbonate) and up to 40% by weight of a vinyl ester.

BACKGROUND OF THE INVENTION

Polymers of diethylene glycol bis(allyl carbonate), which is known commercially in its monomeric form as allyl diglycol carbonate and in either its monomeric or polymerized form as CR-39 (a tradename of the Chemical Division of the Pittsburgh Plate Glass Company), form a clear plastic having good optical and scratch-resistant properties and, as such, are used primarily in the production of optical lenses and of flat, transparent sheets. See, for example, *Encyclopedia of Polymer Science and Technology*, Vol. 1, pages 799–803, Interscience Publishers, New York, 1964.

Diethylene glycol bis(allyl carbonate) typically is polymerized with free-radical initiators to give cross-linked, thermoset materials. Since the monomer is relatively unreactive, about 3 to 5% of initiator based on the weight of monomer is typically required. Commonly used initiators are di-isopropyl peroxydicarbonate, known as IPP in the trade, and benzoyl peroxide.

For the manufacture of ophthalmic-quality thermoplastic lenses, diethylene glycol bis(allyl carbonate) is mixed with the initiator and cast in a mold having the appropriate curvature. The time of polymerization, or cure cycle, is a function of the rate at which the heat of polymerization can be removed. Typically the lens is cured by placing the charged mold either in an air oven or a water bath for up to twenty-four hours.

One of the problems of casting diethylene glycol bis(allyl carbonate) in such molds is shrinkage of the monomer during polymerization, a substantial portion of which polymerization occurs within the molds themselves. For example, diethylene glycol bis(allyl carbonate) can shrink as much as 14% in volume during polymerization. Such shrinkage imposes stresses on the casting formed in the mold due to adherence of the casting to the mold surface. These stresses cause the lens casting either to lose intimate contact with the mold surface and/or cause cracking of the lens castings or the mold itself. In sum, shrinkage causes changes in dimensions, internal stresses in the cast lenses, cracking and/or separation from the mold walls yielding surfaces of inadequate smoothness.

It is known that volume shrinkage during polymerization can be reduced to some degree by either of two methods: either a "syrup" can be formed by dissolving a previously prepared polymer in the monomer to be cast or the monomer can be prepolymerized to low conversion before charging it to the mold.

By the first known method, addition of a previously prepared polymer often results in a phase separation from the diethylene glycol bis(allyl carbonate) resin matrix such that the cured system is rendered opaque or transparent with striations and unsuitable as an ophthalmic lens.

By the second known method, conventional prepolymerization before charging into the molds has not successfully been used effectively to reduce subsequent shrinkage of diethylene glycol bis(allyl carbonate) during complete polymerization. Prepolymerization cannot substantially reduce shrinkage because low conversion is suggested. Furthermore, a prepolymerization step in conventional manner with high amount of initiator tends to overpolymerize the composition, producing a gel that excludes its further use.

It can thus be readily appreciated that provision of a method of prepolymerizing a monomer composition containing diethylene glycol bis(allyl carbonate) which confers on the art the advantage of reducing volume shrinkage during polymerization while casting in a glass mold and increases the yield of ophthalmic plastic lenses from glass molds, and eliminates the previously discussed problems, would be a highly desirable advance over the current state of technology.

OBJECTS OF THE INVENTION

It is an object of this invention to provide a method of prepolymerizing a diethylene glycol bis(allyl carbonate) casting composition containing up to 40% by weight of a vinyl ester.

It is a second object of this invention to provide a method for reducing shrinkage in the mold during polymerization of a diethylene glycol bis(allyl carbonate) casting composition containing up to 40% by weight of a vinyl ester.

It is an additional object of the invention to provide a method for increasing the effective yield of plastic lenses of ophthalmic quality from casting a diethylene glycol bis(allyl carbonate) composition containing up to 40% by weight of a vinyl ester in glass molds.

It is also an object of the invention to provide a casting composition capable of being prepolymerized by a free radical initiator and further polymerized by such an initiator to uniform polymerized products suitable for molding of plastic lenses of ophthalmic quality.

It is a still further object of the invention to provide for the preparation of novel ophthalmic plastic lenses of a composition containing diethylene glycol bis(allyl carbonate) and up to 40% by weight of a vinyl ester.

These and other objects and advantages of the present invention will become more readily apparent after consideration of the following.

STATEMENT AND ADVANTAGES OF THE INVENTION

In one aspect the present invention is directed to a casting composition suitable for forming high quality ophthalmic lenses, which comprises 60 to 100 percent by weight of diethylene glycol bis(allyl carbonate) and 0 to 40 percent by weight of vinyl ester.

In a further aspect, the invention relates to a polymerization process that reduces the amount of shrinkage of a composition containing diethylene glycol bis(allyl carbonate) and up to 40% by weight of a vinyl ester during its final polymerization in a mold, which comprises prepolymerizing the composition to the highest possible or practical degree of conversion while also avoiding overpolymerization.

To prepolymerize with the highest possible or practical level of conversion while preventing overpolymerization, a small amount of initiator is added and polymerization is effected at a temperature higher than the one hour half-lifetime temperature of the initiator.

The half-lifetime of an initiator at any specified temperature is defined as the time in which the initiator loses half of its activity. For a peroxide-type initiator, the one hour half-lifetime temperature is the temperature at which one-half of the peroxide originally present will decompose in one hour. Therefore, half-lifetime temperature provides a useful and effective guide to the selection of initiators for specific formulations and processing conditions. The initiators suitable for use in the present invention have a one hour half-lifetime temperature in the range of about 50° to about 100° C.

For prepolymerization of a monomer mixture containing diethylene glycol bis(allyl carbonate), any of the conventional free radical-type initiators, especially the peroxide-type initiators, with a suitable half-lifetime temperature can be used. A diacyl peroxide-type initiator can be employed such as benzoyl peroxide having a one hour half-lifetime temperature of 91° C. A peroxydicarbonate-type initiator advantageously can be used while di-npropyl peroxydicarbonate having a one hour half-lifetime temperature of 66° C. and di-isopropyl peroxydicarbonate having a one hour half-lifetime temperature of 66° C. are preferred and di-secbutyl peroxydicarbonate having a one hour half-lifetime temperature of 67° C. is most preferred.

The initiator added to the composition in the prepolymerization step may be a single initiator or a combination of initiators. Furthermore, the initiator used in the prepolymerization step may be the same as or different than the initiator or initiators used for final polymerization within the mold.

An effective amount of initiator, advantageously only a small amount, is used in the prepolymerization step. From 0.03 to 0.1% by weight of at least one free radical-type initiator is preferred. From 0.05 to 0.08% by weight is most preferred.

Use of temperatures higher than the one hour half-lifetime temperature assures that the small amount of initiator added in the prepolymerization step will be consumed and the finished prepolymer syrup will not contain a substantial amount of initiator.

In the following section, the invention is described in greater detail to illustrate several of its especially advantageous embodiments.

DESCRIPTION OF CERTAIN PREFERRED EMBODIMENTS

In the prepolymerization step, 0.03 to 0.10% by weight of a peroxide initiator is added to the composition containing diethylene glycol bis(allyl carbonate) monomer. Preferably, the initiator is added in an amount of 0.05 to 0.08% by weight of monomer. The initiator and monomer composition are advantageously mixed in a slow speed agitator.

The initiator is added with the monomer at room temperature. Immediately after adding the initiator, the temperature is raised to about 170° to 230° F., preferably 200° F. The mixture is held at around 200° F. until the viscosity increases from its initial value of about 5 centipoise to a viscosity suitable for pumping into the casting molds, advantageously about 30 to 200 centipoise. A viscosity of about 110 to 130 centipoise is preferred.

When the viscosity of 100 to 200 centipoise is reached, the mixture is cooled down below room temperature. The prepolymer syrup so obtained can then be stored for later use at room temperature or below, for example, at 50 to 70° F.

Just prior to filling the molds for casting of the plastic lenses, an effective amount of an initiator, preferably 1.0 to 4.0% by weight, is added to the prepolymer syrup to form the molding compound. The initiator can be the same or a different initiator than used in the prepolymerization step. The molding compound is charged into a glass mold, which mold is then placed in a water bath and cured in a six to twenty-four hour cycle time.

Advantageously, the starting monomer may contain from 0 to 40% by weight of a vinyl ester for promoting the prepolymerization step. Preferably, from 0 to 40% by weight of vinyl acetate is added. Adding from 10 to 40% by weight of vinyl acetate is especially preferred. A composition of 20% by weight of vinyl acetate and 80% by weight of diethylene glycol bis(allyl carbonate) is most preferred.

Diethylene glycol bis(allyl carbonate) exhibits about 14% shrinkage in volume during polymerization and vinyl acetate exhibits about 20% shrinkage in volume during polymerization. A mixture of the two monomers in a ratio of 80% diethylene glycol bis(allyl carbonate) and 20% vinyl acetate exhibits about 16% shrinkage in volume during polymerization.

In the past, this shrinkage during polymerization occurred predominantly in the mold. By means of the prepolymerization step, some of the shrinkage occurs prior to charging the prepolymer syrup into the mold. It has been found that 2 to 3% shrinkage in volume occurs during the prepolymerization step itself.

With the prepolymerization step of the present invention, optimum yields of lenses from the casting molds are achieved using heretofore known standard equipment and curing processes. The occurrence of premature opening of and damage to the molds, which can account for as much as 24% of the total production of lenses being rejected as unsuitable for commercial use, is effectively reduced to 0 to 2% of the total production by the method of the present invention.

Other conventional additives known in the art such as release agents, UV-absorbers and compounds for adjusting the refractive index of the lens may be added as necessary to the monomer composition before the prepolymerization step or to the prepolymer syrup before or after adding the initiator and charging the mixture into the casting mold.

Advantageously, the moisture content of the composition is adjusted prior to casting the plastic lenses. The moisture is adjusted to the range of from 500 to 5000 ppm, preferably about 2000 ppm.

Further objects of this invention, together with additional features contributing thereto and advantages accruing therefrom, will be apparent from the following examples of the invention.

EXAMPLE 1

9681 grams of diethylene glycol bis(allyl carbonate) and 2420 grams of vinyl acetate were charged to a reactor. 9.7 grams (0.08% by weight) of di-secbutyl peroxydicarbonate were dissolved in the monomer mixture at room temperature. The temperature was raised to 200° F. within forty-five minutes by adding external heat. At this point, the viscosity of the mixture was about 50 centipoise. The prepolymerization step continued for three hours at which time the temperature was at 185° F. and the viscosity reached 184 centipoise. Moisture was adjusted to 2000 ppm. The prepolymer syrup was then allowed to cool to room temperature.

2% by weight of di-isopropyl peroxydicarbonate was added to the prepolymer syrup and the mixture was charged to thirty-five glass flat-base lens molds. 9.08 grams (0.075% by weight) of a UV-absorber was added just prior to casting. The cast molds were cured according to the following temperature and time schedule in a water curing bath:

115° F. for 2 hours
120° F. for 2 hours
129° F. for 2 hours
140° F. for 1.5 hours
155° F. for 0.5 hours.

Upon completion of the curing schedule, the molds were opened. None of the molds exhibited premature opening of the mold or damage to the mold caused by shrinkage of the casting composition during polymerization.

COMPARATIVE EXAMPLE 2

2% by weight of di-isopropyl peroxydicarbonate was added to a mixture of 80% by weight of diethylene glycol bis(allyl carbonate) and 20% by weight of vinyl acetate. The temperature was raised to 90° F. maximum to initiate polymerization and the mixture was charged to glass molds for casting. The molds were cured with the temperature and time schedule set forth in Example 1. After curing, it was discovered that 24% of the molds exhibited premature opening and/or mold damage due to shrinkage of the casting composition during polymerization.

While the invention has been described with reference to specific examples, it will be understood by those skilled in the art that a range of chemistries may be employed and equivalents may be substituted for elements thereof without departing from the scope of the invention. The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A process for the production of ophthalmic lenses, which comprises:
   prepolymerizing a composition containing diethylene glycol bis(allyl carbonate) and up to 40% by weight of a vinyl ester by adding an effective amount of at least one first free radical type initiator and heating to a temperature above the one hour half-lifetime temperature of the initiator to form a prepolymer syrup;
   adding an effective amount of at least one second free radical type initiator, which may be the same or different from the first initiator, to the prepolymer syrup to form a molding compound;
   charging the molding compound to a mold; and
   curing the molding compound in the mold to polymerize the composition.

2. The process as recited in claim 1, wherein the vinyl ester is vinyl acetate.

3. The process as recited in claim 1, wherein the composition contains from 10 to 40% by weight of a vinyl ester.

4. The process as recited in claim 3, wherein the vinyl ester is vinyl acetate.

5. The process as recited in claim 1, wherein the composition contains 20% by weight of a vinyl ester.

6. The process as recited in claim 5, wherein the vinyl ester is vinyl acetate.

7. The process as recited in claim 1, wherein the first initiator is a peroxide initiator selected from the group consisting of di-npropyl peroxydicarbonate, di-secbutyl peroxydicarbonate, di-isopropyl peroxydicarbonate and benzoyl peroxide.

8. The process as recited in claim 1, wherein the first initiator is di-secbutyl peroxydicarbonate.

9. The process as recited in claim 1, wherein the first initiator and the second initiator are different.

10. The process as recited in claim 9, wherein the first initiator is di-secbutyl peroxydicarbonate and the second initiator is di-isopropyl peroxydicarbonate.

11. The process as recited in claim 1, wherein the composition is heated to a temperature of from 170° to 230° F.

12. The process as recited in claim 1, further comprising adjusting the moisture content of the composition in the range of from 500 to 5000 ppm prior to charging the mold.

13. A process for the production of ophthalmic lenses, which comprises:
    prepolymerizing a composition containing diethylene glycol bis(allyl carbonate) and up to 40% by weight of a vinyl ester by adding from 0.03 to 0.10% by weight of at least one first free radical type initiator and heating to a temperature above the one hour half-lifetime temperature of the initiator until the viscosity of the composition is in the range of about 30 to 200 centipoise to form a prepolymer syrup;
    adding from 1.0 to 4.0% by weight of at least one second free radical type initiator, which may be the same or different from the first initiator, to the prepolymer syrup to form a molding compound;
    charging the molding compound to a mold; and
    curing the molding compound in the mold to polymerize the composition.

14. The process as recited in claim 13, wherein the vinyl ester is vinyl acetate.

15. The process as recited in claim 13, wherein the composition contains from 10 to 40% by weight of a vinyl ester.

16. The process as recited in claim 15, wherein the vinyl ester is vinyl acetate.

17. The process as recited in claim 13, wherein the composition contains 20% by weight of a vinyl ester.

18. The process as recited in claim 17, wherein the vinyl ester is vinyl acetate.

19. The process as recited in claim 13, wherein the first initiator is a peroxide initiator selected from the group consisting of di-npropyl peroxydicarbonate, di-secbutyl peroxydicarbonate, di-isopropyl peroxydicarbonate and benzoyl peroxide.

20. The process as recited in claim 13, wherein the first initiator is di-secbutyl peroxydicarbonate.

21. The process as recited in claim 13, wherein the first initiator and the second initiator are different.

22. The process as recited in claim 21, wherein the first initiator is di-secbutyl peroxydicarbonate and the second initiator is di-isopropyl peroxydicarbonate.

23. The process as recited in claim 13, wherein from 0.05 to 0.08% of the first initiator is added.

24. The process as recited in claim 23, wherein the first initiator is di-secbutyl peroxydicarbonate.

25. The process as recited in claim 13, wherein the composition is heated to a temperature of from 170° to 230° F.

26. The process as recited in claim 13, wherein the composition is heated until the viscosity is in the range of 110 to 130 centipoise.

27. The process as recited in claim 14, further comprising adjusting the moisture content of the composition in the range of from 500 to 5000 ppm prior to charging the mold.

28. A method of polymerizing a composition containing from 60 to 100% by weight of diethylene glycol bis(allyl carbonate) and 0 to 40% by weight of vinyl ester, which comprises:
  adding from 0.03 to 0.10% by weight of at least one first free radical type initiator;
  heating to a temperature higher than the one hour half-lifetime temperature of the initiator until the viscosity of the composition is in the range of 30 to 200 centipoise to form a prepolymer syrup;
  adding from 1.0 to 4.0% by weight of at least one second free radical type initiator, which may be the same or different from the first initiator, to the prepolymer syrup to form a molding compound; and
  curing the molding compound.

29. The method as recited in claim 28, wherein the vinyl ester is vinyl acetate.

30. The method as recited in claim 28, wherein the composition contains from 10 to 40% by weight of a vinyl ester.

31. The method as recited in claim 30, wherein the vinyl ester is vinyl acetate.

32. The method as recited in claim 28, wherein the composition contains 20% by weight of a vinyl ester.

33. The method as recited in claim 32, wherein the vinyl ester is vinyl acetate.

34. The method as recited in claim 28, wherein the first initiator is a peroxide initiator selected from the group consisting of di-npropyl peroxydicarbonate, di-secbutyl peroxydicarbonate, di-isopropyl peroxydicarbonate and benzoyl peroxide.

35. The method as recited in claim 28, wherein the first initiator is di-secbutyl peroxydicarbonate.

36. The method as recited in claim 28, wherein from 0.05 to 0.08% of the first initiator is added.

37. The method as recited in claim 28, wherein the composition is heated to a temperature of from 170 to 230° F.

38. The method as recited in claim 28, wherein the composition is heated until the viscosity is in the range of 110 to 130 centipoise.

39. The method as recited in claim 28, wherein the first initiator and the second initiator are different.

40. The process as recited in claim 39, wherein the first initiator is di-secbutyl peroxydicarbonate and the second initiator is di-isopropyl peroxydicarbonate.

41. The method as recited in claim 36, wherein the first initiator is di-secbutyl peroxydicarbonate.

42. The method as recited in claim 28, further comprising adjusting the moisture content of the composition in the range of from 500 to 5000 ppm prior to curing the molding compound.

* * * * *

UNITED STATES PATENT AND TRADEMARK OFFICE
CERTIFICATE OF CORRECTION

PATENT NO. : 4,623,708

DATED : November 18, 1986

INVENTOR(S) : Robert I. Ezrielev, Melvin E. Kamen, Donald H. Petcen, Glenn Page Johnson It is certified that error appears in the above-identified patent and that said Letters Patent is hereby corrected as shown below:

> On the Title Page
> INVENTORS should read:
>
> "Robert I. Ezrielev, Edison; Melvin E. Kamen,
> Woodcliff Right, both of N.J.; Donald H. Petcen,
> Colonial Heights, Glenn Page Johnson, Richmond,
> both from Va."
>
>
> This Certificate supercedes Certificate of Correction issued
> May 26, 1987.

Signed and Sealed this

Twenty-sixth Day of January, 1988

Attest:

DONALD J. QUIGG

Attesting Officer      Commissioner of Patents and Trademarks